United States Patent
Bringolf et al.

[11] Patent Number: 5,803,418
[45] Date of Patent: Sep. 8, 1998

[54] CONVERTIBLE STRUCTURAL ELEMENT

[75] Inventors: Serge Bringolf, La Chaux-de-Fonds; Alain Burri, Conches/Genève, both of Switzerland

[73] Assignee: BBD, S.A., La Chaux-de-Fond, Switzerland

[21] Appl. No.: 422,506

[22] Filed: Apr. 13, 1995

[30] Foreign Application Priority Data

Apr. 14, 1994 [CH] Switzerland ................. 01117/94

[51] Int. Cl.⁶ ............................................. E04H 12/18
[52] U.S. Cl. .................. 248/158; 52/108; 52/730.1; 248/161; 248/317; 248/327
[58] Field of Search .................... 248/158, 157, 248/188.1, 161, 317, 327; 52/108, 730.1

[56] References Cited

U.S. PATENT DOCUMENTS

| | | | |
|---|---|---|---|
| 2,554,300 | 5/1951 | Hayakawa | 52/108 |
| 3,645,146 | 2/1972 | Nagin | 52/108 X |
| 4,745,714 | 5/1988 | Matsutani | 52/108 |
| 5,355,643 | 10/1994 | Bringolf | 52/108 |

FOREIGN PATENT DOCUMENTS

| | | |
|---|---|---|
| 1136948 | 5/1957 | France . |
| 2044434 | 3/1971 | Germany . |
| 1141257 | 1/1969 | United Kingdom . |
| 9207154 | 4/1992 | WIPO . |

*Primary Examiner*—Ramon O. Ramirez
*Assistant Examiner*—Derek J. Berger

[57] ABSTRACT

This convertible structural element comprises two link chains (1, 2) which, after assembly, are capable together of assuming the form of a rigid beam. The links (3, 4) of the two chains are provided with antagonistic bearing points (10, 11), the first bearing point (10) of a link of rank n of each chain interacting with a second bearing point (11) of a link of rank n-1 in order to trap fastening elements which the pins (7, 8) of the links of the other chain form, when the element is made rigid. At least some links of at least one of the chains of the structural element exhibit a row of teeth (13) which, together with the teeth of the neighbouring links in the direction of the length of the element, form a continuous toothing extending laterally over the entire length of the element.

9 Claims, 8 Drawing Sheets

CONVERTIBLE STRUCTURAL ELEMENT

BACKGROUND OF THE INVENTION

1. Field of the Invention

The present invention relates to a convertible structural element comprising two flexible components which, after assembly, are capable together of assuming the form of a rigid beam.

2. Description of the Prior Art

Such a convertible structural element is described in International Patent Application No. WO 92/07154 filed on 4 Oct. 1991.

In a preferred version of the structural element described in the aforementioned international application, its components are two link chains of which the links are articulated together about respective pins and provided with antagonistic bearing points, the first bearing point of a link of rank n of each chain inter-acting with a second bearing point of a link of rank n-1 in order to trap fastening elements that the pins of the links of the other chain form, when the element is made rigid.

SUMMARY OF THE INVENTION

The present invention aims to improve the structural element briefly described hereinabove by providing it with means making it possible not only to make it easier to assemble, but also to improve its stability after assembly.

Thus, the structural element according to the invention, as defined hereinabove, is one wherein at least some links of at least one of the chains of the structural element exhibit a row of teeth which, together with the teeth of the neighbouring links in the direction of the length of the element, form a continuous toothing extending over the entire length of the element, said structural element exhibiting, in its assembled configuration, a rigid elongate body from which said toothing projects in order to allow meshing over the entire width of this element.

By virtue of these characteristics, a convertible structural element is obtained which longitudinally exhibits at least one rack, the teeth of which can interact with toothed stabilizing members meshing over a width of the structural element which may range up to its total width, these toothed members being placed at the edges of the assembled structural element and, at the same time, taking up the load applied to the element, through the plates of its links. Thus, the pins of the chains can be freed of their load-withstanding role.

Out of preference, the teeth of the links are dimensioned to correspond with the characteristics of the standards in force for toothings.

BRIEF DESCRIPTION OF THE DRAWINGS

Other features and advantages of the present invention will emerge during the description which will follow, given solely by way of example and made with reference to the appended drawings in which:

FIG. 2 is a part view of an assembled structural element according to the invention, the links of the chains being viewed edge-on;

FIG. 4 is a view of the overall device represented in FIG. 3, the links of the chains being viewed edge-on;

DESCRIPTION OF THE PREFERRED EMBODIMENTS

Figure 1:
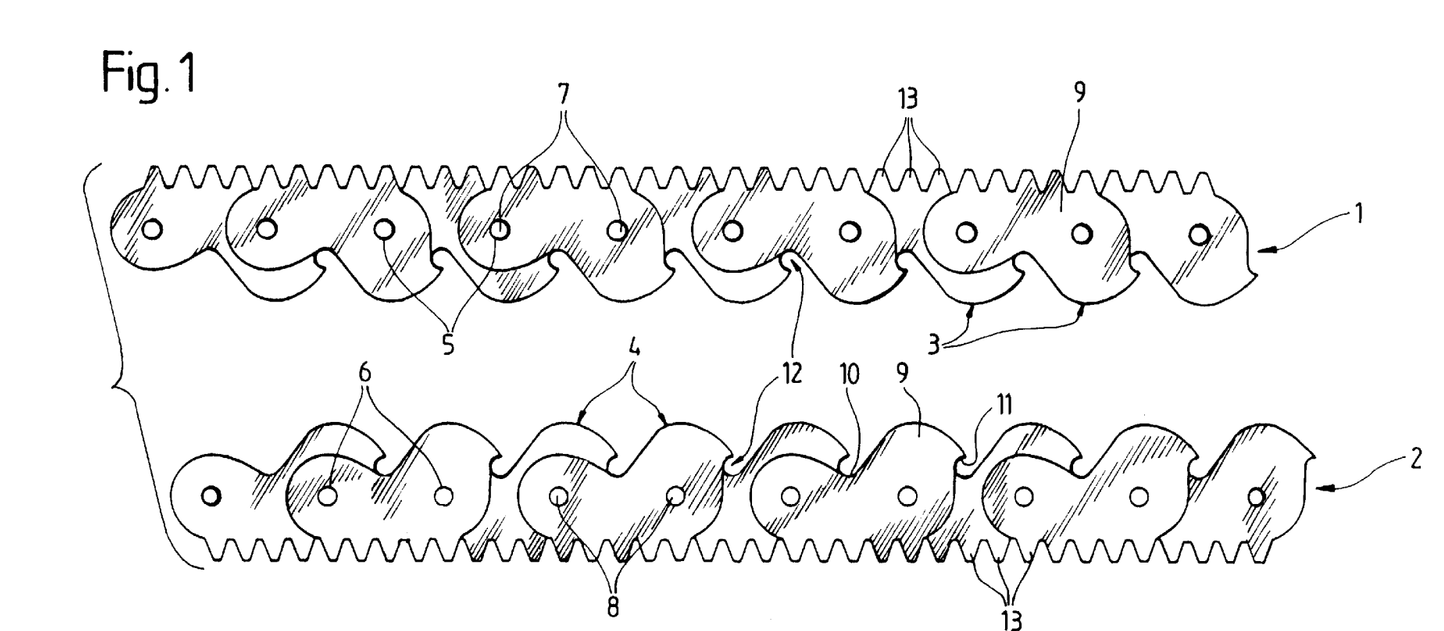
FIG. 1 shows a side view of a few links of the two chains of the structural element in their dis-assembled configuration.

Referring first of all to FIG. 1, it can be seen that the convertible structural element according to the invention includes at least two link chains 1 and 2, preferably of identical form, and each composed of a series of links, respectively 3 and 4, it being possible for all the links of the two chains also to have the same form.

Each link has two holes 5 and 6 through which articulation pins 7 and 8 can pass, these pins belonging respectively to the link chain 1 and to the link chain 2.

Each link includes a plate 9 exhibiting a first lateral bearing point 10 physically embodied by a depression in one of the flanks of the plate 9, as well as a second lateral bearing point 11 defined by a hooked part which is provided at one of the ends of each plate 9. It can be seen in FIG. 1 that the lateral bearing point 10 of the plate of a given link forms, together with the lateral bearing point 11 of one of the plates before it (or after it) in the link chain, a notch 12 which is designed to close up over the corresponding pin 7 or 8 of the link chain opposite, when the structural element is assembled.

Figures 1A, 1B, 7:
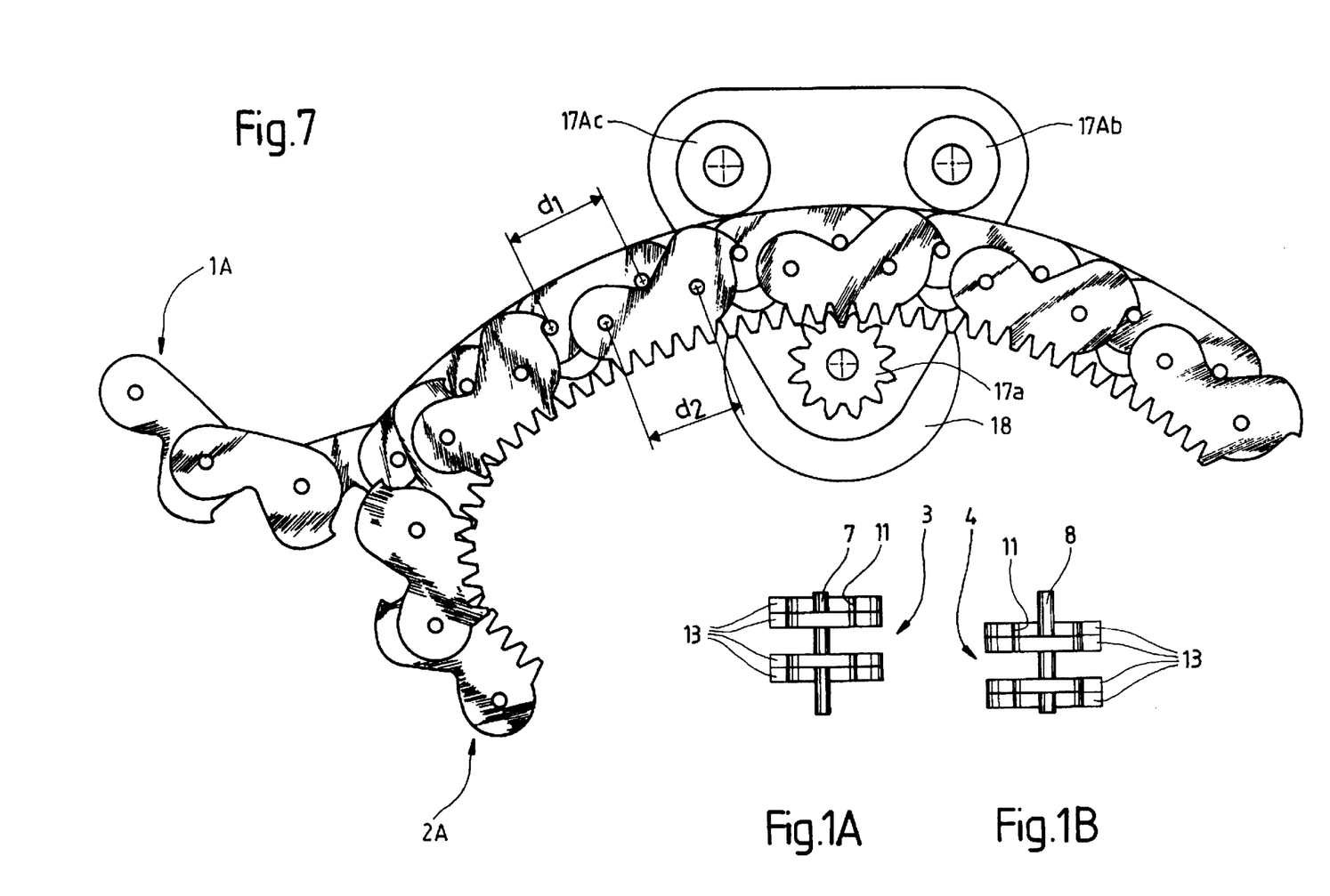
FIGS. 1A and 1B show, for purposes of explanation, one link of each chain of the structural element.
FIG. 7 shows an alternative of the invention, applied to the formation of a curved and rigid structural element.
Figure 2:
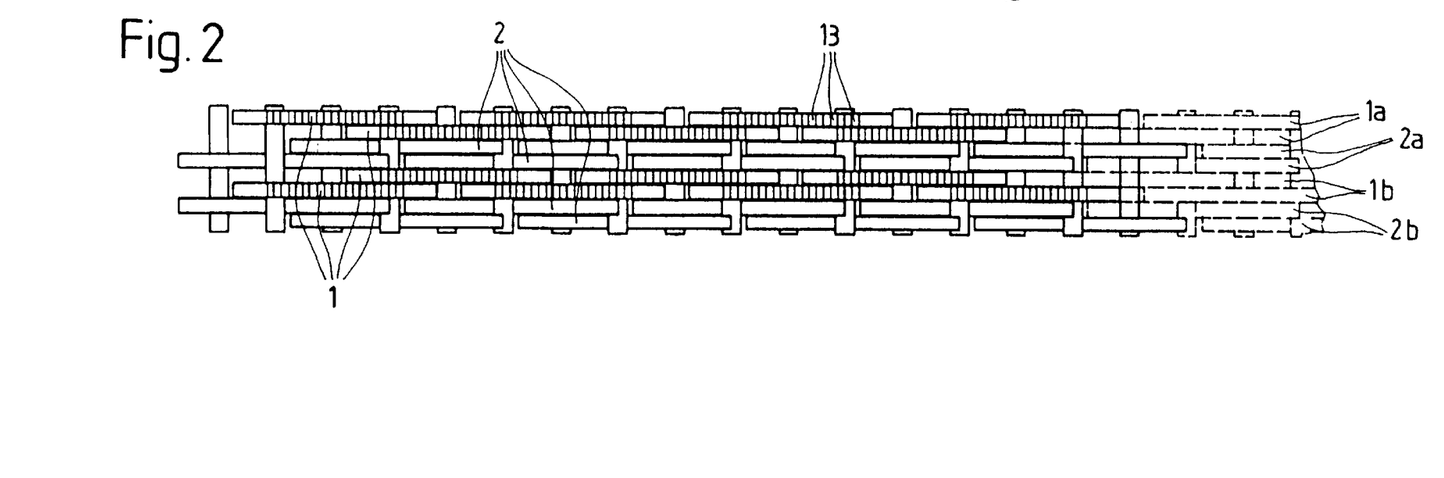

FIGS. 1A, 1B and 2 reveal such an assembled structural element, it being understood that in the example represented, each chain 1 and 2 is in fact formed of two parallel rows of links, respectively 1a, 1b and 2a, 2b, the two chains being laterally imbricated in one another.

The foregoing description does nothing but repeat briefly the description in the aforementioned international patent application to which reference can be made for more detail.

It should be noted that each chain may be formed of a greater number of parallel rows of links, this number being chosen on the basis of the sturdiness and rigidity of the structural element which they are to form after assembly.

In accordance with the present invention, and with the purpose on the one hand of improving the stability of the beam formed by the structural element and, on the other hand, of making assembly and disassembly thereof easier, the present invention envisages equipping each link of at least one of the chains, with a row of teeth 13 on the edge of the link opposite that which has said bearing points 10 and 11, the row of teeth of each link of the chain forming, together with the teeth of the adjacent links, a continuous toothing acting as a rack. In the example represented in FIG. 2, all the links of the two chains include a row of teeth 13, so that the rack of each chain in some sense includes four parallel "tracks". However, according to alternatives, the toothings could be provided on just one single row of links, the choice being dictated by considerations of mechanical rigidity and ease of assembly of the unit.

It will be noted, however, that according to an important feature of the invention, the convertible element (see FIGS. 3 and 4 in particular) in its assembled configuration exhibits a rigid body C delimited by two imaginary planes P1 and P2 parallel to these pins 7, 8 from which the teeth 13 which constitute the racks project outwards.

Figure 3:
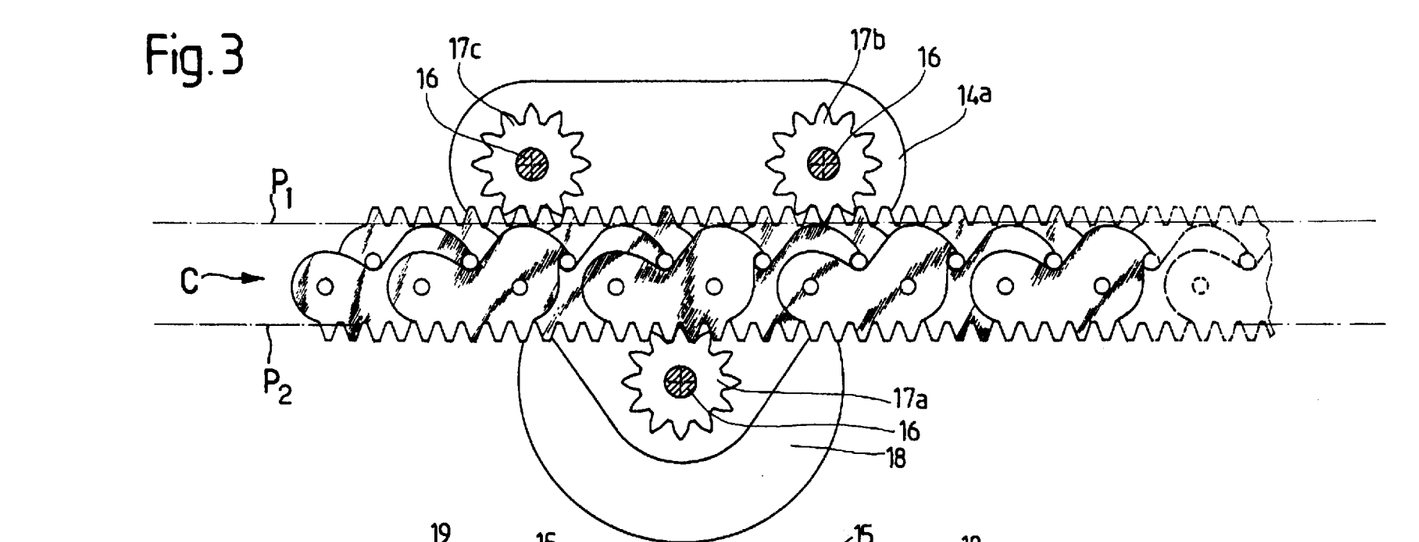
FIG. 3 is a view of the assembled structural element equipped with a device which allows translation thereof in the longitudinal direction.
Figure 4:
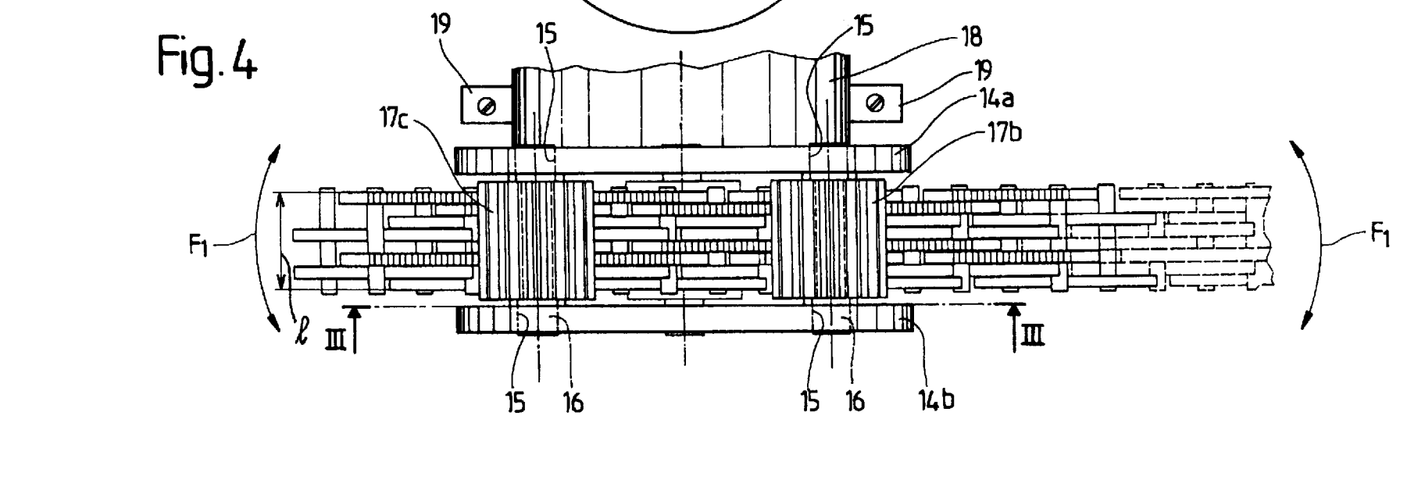

In this way, meshing with these teeth is possible over the entire width 1 of the element.

FIGS. 1A and 1B respectively show a link 3, 4 of each chain 1 and 2, separated from the other links and viewed from the bearing point 11 side.

FIGS. 3 and 4 show how the convertible structural element according to the invention may be associated with a device which allows the horizontal translation thereof. This device comprises a chassis formed of two panels 14a and 14b located on either side of the horizontal translation path of the structural element. Each panel 14a, 14b has a triangular shape and close to each vertex of the triangle has a hole 15 receiving the adapter end of the spindle 16 of a pinion 17a, 17b, 17c respectively. These pinions have toothings with the same characteristics as those of the teeth of the structural element. Note that these characteristics may correspond to the standards in force for conventional toothings. This means that the pinions may be elements which are commercially available.

One, 14a, of the panels is fixed to the casing of a drive motor 18, for example an electric or hydraulic motor, which is rotationally coupled to the pinion 17a and which thus serves to provide the longitudinal motion of the structural element. The casing of the motor 18 may be provided with fastening lugs 19 to allow the unit to be fastened onto an appropriate support (not represented).

By virtue of this device, it is therefore possible not only to ensure longitudinal motion of the structural element by causing the motor 18 to rotate in one direction or the other, but also to improve the lateral stability thereof (see the arrows F1 in FIG. 4), the pinions also forming elements for lateral support and guidance and doing so over the whole width 1 of the structural element.

Furthermore, assuming that the structural element of FIGS. 3 and 4 is to withstand a load in the direction of its longitudinal displacement, this load is taken up through the toothings of the chain 2, by the pinion 17a and, from there, by the chassis 14a, 14b and the motor 18. As a result, the design of the pins of the chains can be slimmed down because these are used above all to fasten the links of the chains together. Moreover, it is possible to make not only the pinion 17a but also the other pinions 17b and 17c driving pinions so that the latter pinions can also contribute to taking up the load.

It should also be noted that the more parallel rows of links each chain includes, the greater the load applied to the structural element can be, since all these rows can be equipped with toothing interacting with the same pinions.

Another advantage of the presence of the teeth on the plates consists in the fact that their interaction with the pinions can take place on the already-assembled element, regardless as to whether or not there is a lateral space between the plates.

Figure 5:
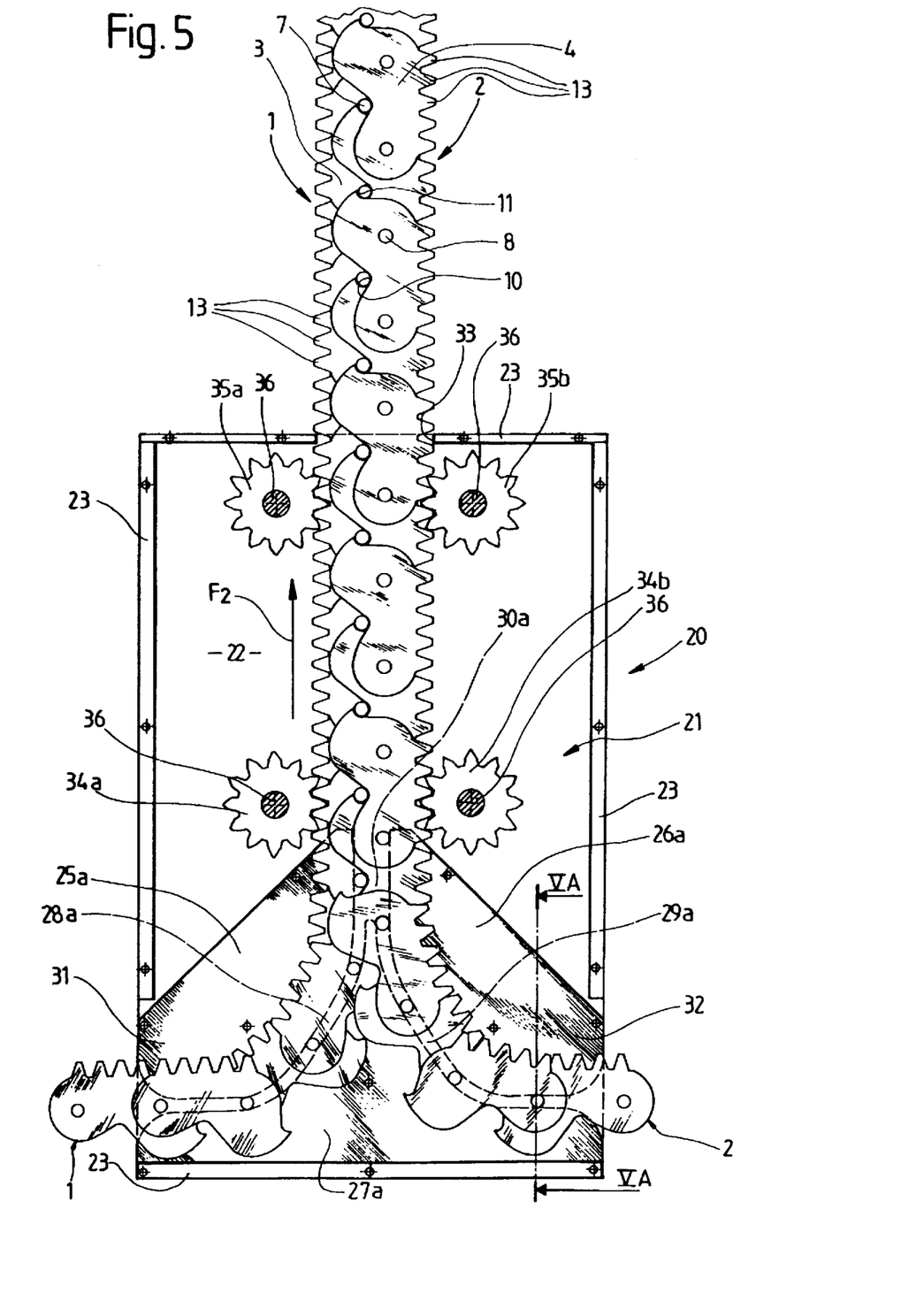
FIG. 5 is a front-on view of an assembly module making it possible to convert the flexible chains, components of the structural element according to the invention, into this element in its rigid form, assembly taking place in a motorized fashion.
Figure 5A:
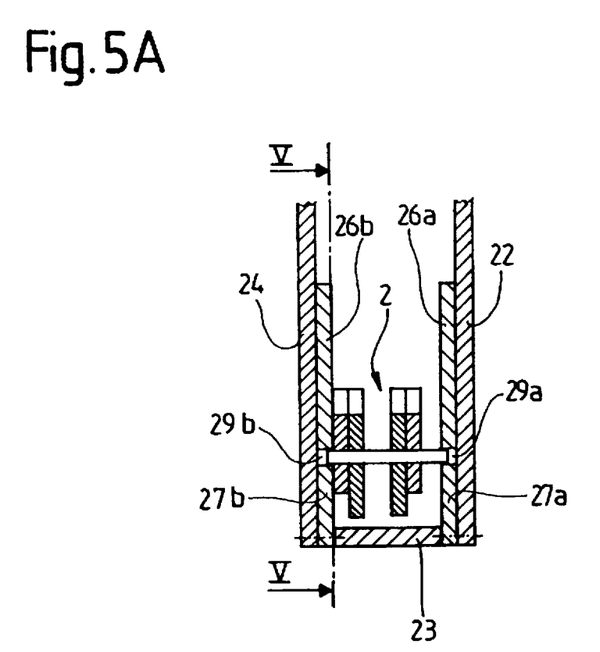
FIG. 5A is a part section on VA—VA of FIG. 5.
Figure 6:
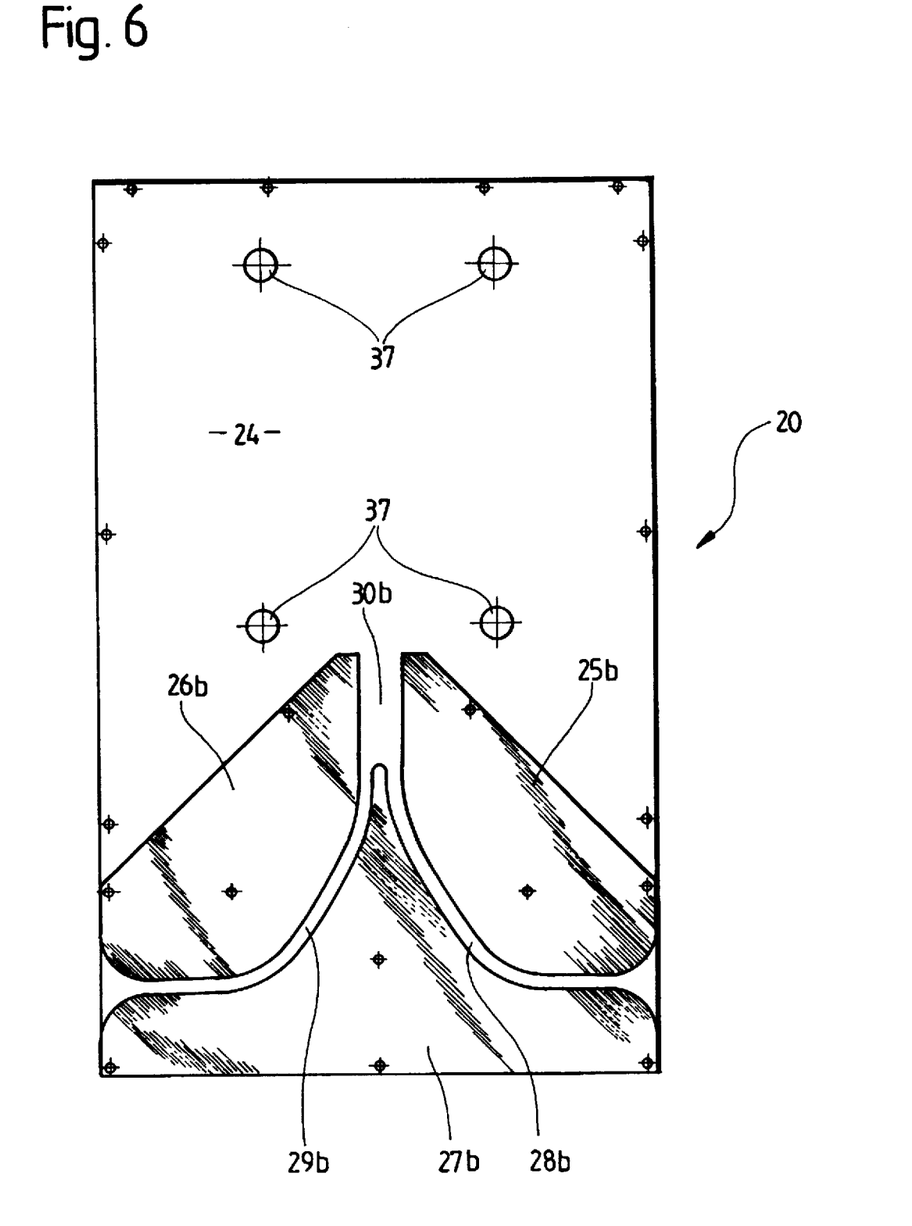
FIG. 6 shows a front-on view, on the inside, of the cover of the assembly module represented in FIG. 5.

FIGS. 5, 5A and 6 show how the characteristics of the invention can be implemented for the automatic assembly of the two chains 1 and 2 thus to form a beam constituting the structural element according to the invention.

These FIGS. 5, 5A and 6 represent the structural element associated with an assembly mechanism 20. The latter includes an assembly module 21 formed of a base 22, of sides 23 and of a cover 24, the sides 23 not extending right around the module. Panels 25a, 25b, 26a, 26b and 27a, 27b are respectively attached against the base and the cover of the assembly module so as to delimit, in threes, two curved assembly guides 28a, 28b and 29a, 29b which meet respectively to emerge in two straight guides 30a and 30b.

The assembly module 21 includes two lateral entrances 31 and 32, respectively for the chains 1 and 2, and one exit 33 for the assembled structural element.

In the embodiment represented, the entrances 31 and 32 are situated respectively on each side of the assembly module. However, according to alternatives, it is possible to provide its entrances on the same side of this module or on different sides depending on the requirements of the construction. In these cases, the profiles of the guides will naturally have to be adapted in consequence.

The exit 33 is situated on the path of progression of the structural element during assembly, on either side of which path there are placed two pairs of guide pinions 34a, 34b and 35a, 35b which are designed to come into engagement with the structural element over its entire width, on the one hand, at the point where the latter has just left the straight guides 30a and 30b and on the other hand, at the point where this structural element will leave the assembly module 21.

These pinions are mounted respectively on spindles swivelling in holes 37 provided for this purpose in the base and the cover of the module 21. It is desirable for at least one of these pinions to be coupled to a drive motor (not represented) in the manner indicated in FIG. 3. In this way, assembly and disassembly of the structural element can take place automatically and in a motorized fashion. In fact, the pins of the chains 1 and 2 are progressively entrapped in the notches 12 (FIG. 1) as they penetrate, via their ends, the straight guides 30a and 30b respectively. The chains are therefore driven in the direction of the arrow F2 (FIG. 5). In contrast, when the chains are driven in the opposite direction, the pins are released from the notches 12. By virtue of the characteristics of the invention, the translational movement of the structural element is therefore brought about positively through the interaction of the driving pinions with the toothings of the chains 1 and 2.

The pairs of pinions 34a, 34b and 35a, 35b also contribute to increasing the stability of the beam once formed, by the lateral support which they exert on the links of the two chains in engagement with these pinions via their toothing.

Figure 5B:
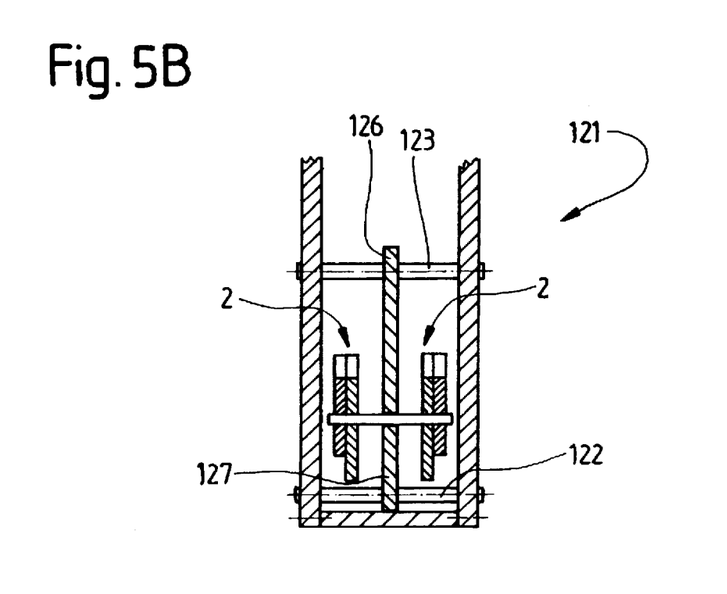
FIG. 5B is a part section similar to that of FIG. 5A, of an alternative assembly module for a structural element in which the chains include a longitudinal gap betweep the plates of each link.

FIG. 5B partially shows another embodiment of an assembly module 121, the cover and base of which are equipped with spacer pieces 122, 123 used to support three guide panels 126, 127, the forms of which are those of the respective panels 25a, 25b, 26a, 26b, and 27a, 27b. (The panel 125 is not visible in FIG. 5B). These panels therefore define guides of the same profile as those represented in FIGS. 5, 5A and 6 and which therefore allow assembly and disassembly of the structural element. This construction has the advantage of greater simplicity, but it requires the presence of a gap between the plates of each link of one of the chains (in this case the chain 1) so that this chain can have a longitudinal passage for the panels 125, 126 and 127.

Referring now to FIG. 7, it can be seen that the structural element according to the invention may equally well be curved. This form is obtained by selecting, for one of the chains 1A, an inter-pin spacing d1 for the links greater than that d2 for the links of the other chain 2A. The chain 2A in the example represented having the shorter distance d2 will be on the inside of the curve and will include toothing as represented. In contrast, the other chain 1A situated on the outside of the curve will preferably be smooth. Such a structural element can be combined with a translation device similar to the one represented in FIG. 3. The difference in the two devices lies in the fact that the pinions 17a and 17b are replaced by smooth rollers 17Ab and 17Ac allowing them to fit the smooth edge of the chain 1A.

Figure 8:
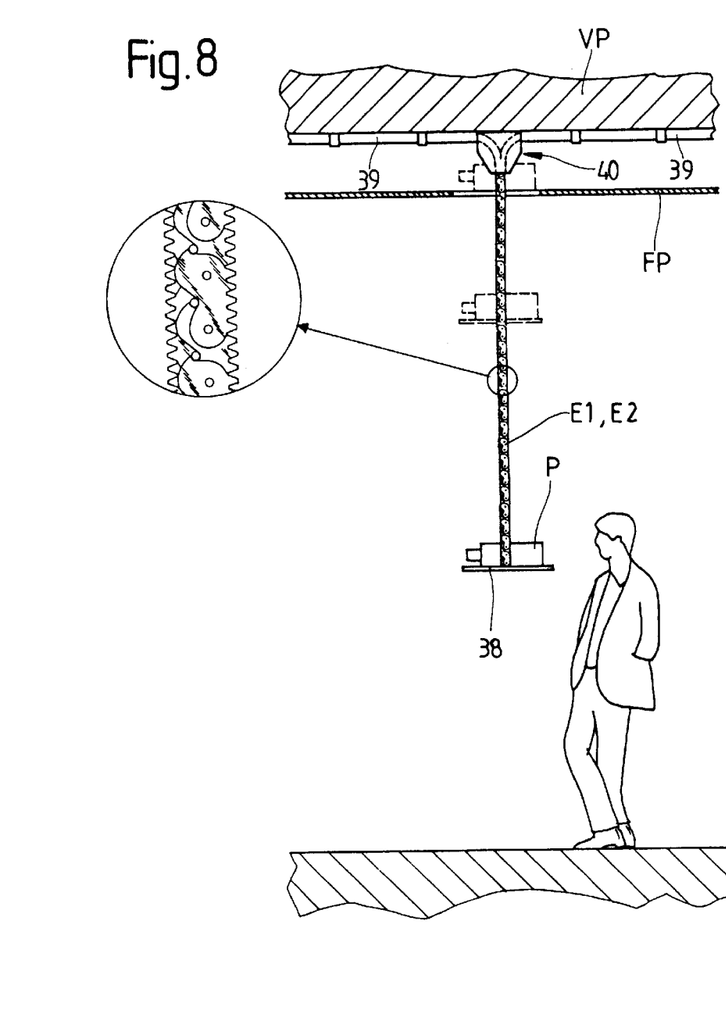
FIG. 8 is a diagrammatic elevation of one application of the structural element according to the invention to a retractable item of projection apparatus, the apparatus being viewed from the side.
Figure 9:
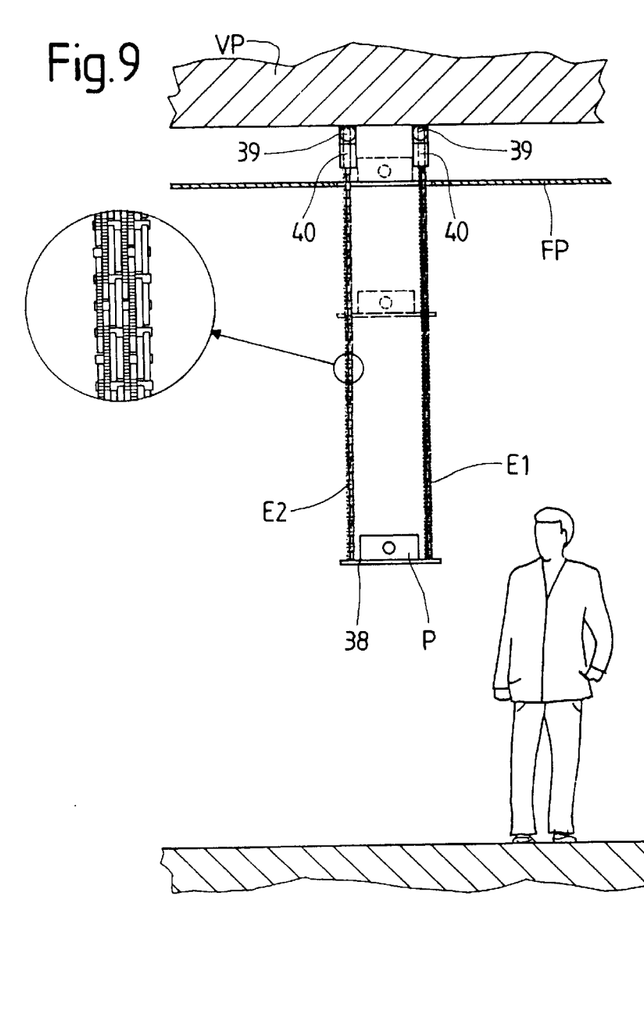
FIG. 9 is a front-on view of the apparatus of FIG. 8.

FIGS. 8 and 9 show a first example (among the many possible examples) of the structural element according to the invention. Here, this relates to an installation making it possible to position an object at any height whatsoever in premises. In the example, this object is an item of apparatus P, for example for slide projection, present in a conference room or the like, it being possible for the projector P to be retracted into a false ceiling FP.

The projector P is placed on a board 38 fastened to two structural elements E1 and E2 according to the invention, mounted in parallel.

In the retracted state, the chains of these structural elements E1 and E2 are housed respectively in two box-type structures 39 fitted under the true ceiling VP of the premises. These box-type structures communicate with an assembly and transmission device 40 also fitted in the false ceiling FP. This device may be designed as per the embodiment represented in FIGS. 5, 5A and 6, or as per that of FIG. 5B. When this unit is used, the projector P can be placed at any height beneath the false ceiling FP or else be retracted into it and concealed from view when it is not in use. In this position, the board 38 may come flush with the false ceiling FP, exactly fitting into the opening provided in the latter. Of course, the board 38 may be used to support items of apparatus or objects other than a projector, to allow the height of use thereof to be adjusted.

It should also be noted that the board 38 may be a component which fits into one of the faces of a double wall, namely the floor of a premises, into which this object is to be retracted, it then being possible for the structural element or elements to be extended either horizontally, the board then having the form of a bracket, for example, or vertically, but then with a downward retraction movement, that is to say one in the opposite direction by comparison with that represented in FIGS. 8 and 9.

Figures 10, 11:
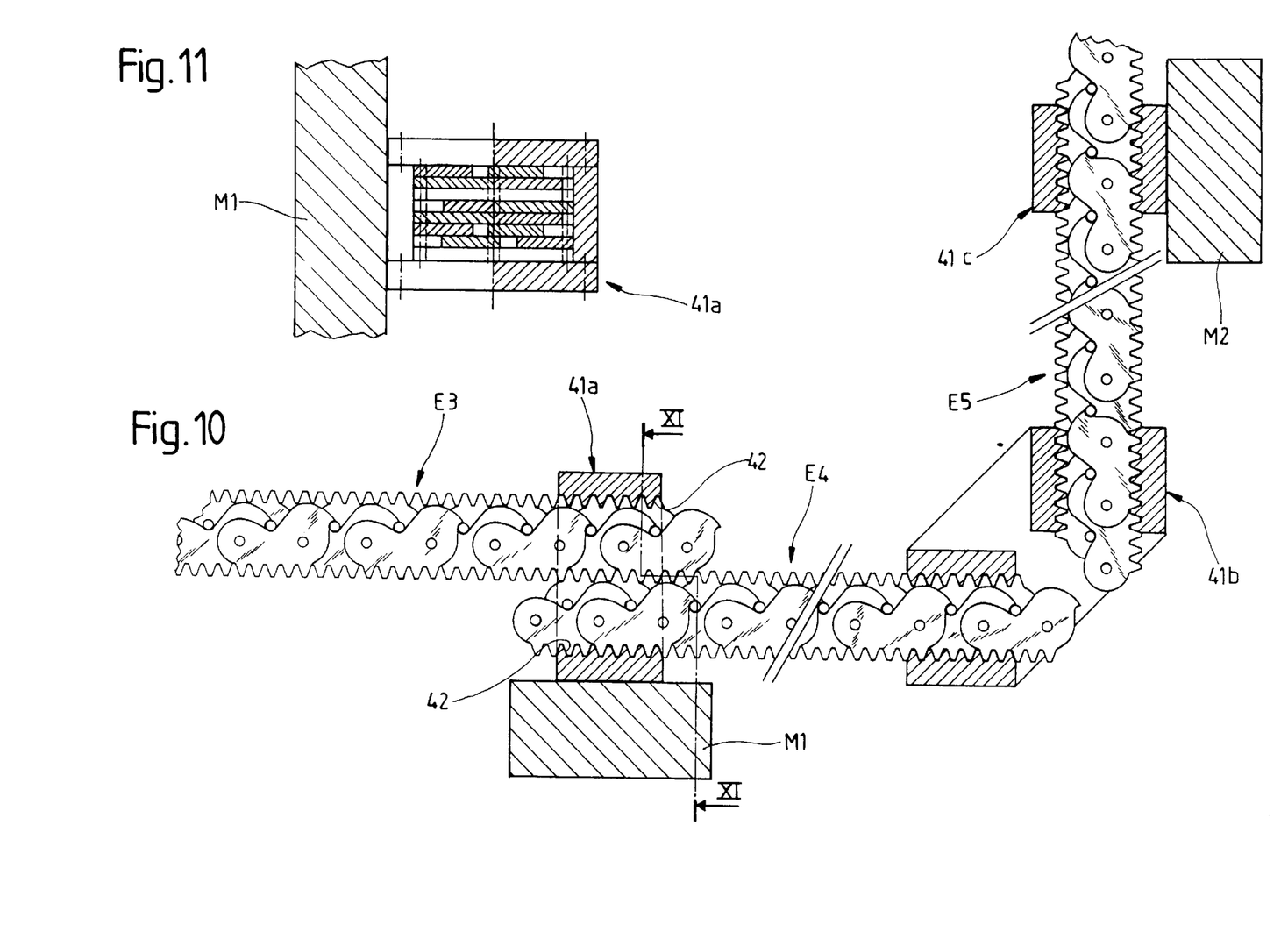
FIG. 10 shows a diagrammatic part view of another application of the invention to a dismantleable structure, for example for display stands.
FIG. 11 is a section taken on XI–XI of FIG. 10.

FIGS. 10 and 11 show another application of the structural element according to the invention, namely the erection of temporary constructions such as display stands, for example. Such a construction may comprise uprights M1, M2 . . . etc., pushed into the ground, for example, and braced by structural elements E3, E4, E5 . . . etc. according to the invention, these structural elements extending horizontally, for example at several heights. Collars 41a, 41b, 41c equipped with toothed impressions 42 may be provided in order to secure the structural elements and the uprights together. The impressions are designed to fit the toothings of the structural elements. Some of these collars, for example the collars 41a and 41b may serve to assemble two structural elements, such as the elements E3 and E4 on the one hand and the structural elements E4 and E5, on the other hand.

Partitions (not represented) fixed to the collars 41a, 41b and 41c may complete the overall construction. The latter is thus entirely modular and, dismantled, takes up only a small amount of space owing to the fact that the structural elements E3, E4, E5, etc. can be rolled up after having been disassembled. Furthermore, by virtue of the interaction with the toothings of the structural elements, the collars firmly hold the construction on the uprights so that the construction has great sturdiness even if only a few structural elements are used along the height for bracing (for example three elements over 2 meters of height).

We claim:

1. A unit comprising:
a structural element including:
two link chains capable of assuming a disassembled configuration wherein said chains are independent and flexible, and an interlocked configuration wherein said chains are interconnected to form a rigid beam,
each of said chains including a row of a plurality of partially overlapping links, and pins having axes extending orthogonally to said links and pivotally connecting successive links to one another, said row extending lengthwise along said element when said element is in said interlocked configuration, each of said links of said row having first and second opposing bearing points, the first bearing point of the n-th link of said row interacting with the second bearing point of the n-1-th link of said row for trapping one of said pins of the other chain when said chains are in said interlocked configuration, the links of said row of one of said chains each including a series of teeth having bearing surfaces extending in planes that are substantially parallel to said axes of said pins, such that, in said interlocked configuration, teeth at each of the extremes of said series of teeth on each of said links are in overlapping side-by-side relationship with the teeth at an extreme of the series of teeth of an adjacent link of said row, wherein said teeth project in a lengthwise continuous manner from one side of said chain for forming a gear rack along the length of said chain;
a chassis (14a, 14b);
three rolling members (17a, 17b and 17c) rotatable mounted on said chassis, a first (17a) of these rolling members being toothed for interacting with the teeth (13) of said row of links of said one of the chains of said structural element for longitudinal translation of said structural element relative to said chassis,
a drive motor (18) coupled to said first rolling member, the second and third of said rolling members (17b, 17c) being in contact with the side of the second of said chains that is positioned opposite to the side of the other chain from which said teeth project.

2. The unit as claimed in claim 1, wherein the links of both of said chains include said series of teeth and said second and third rolling members (17b, 17c) are toothed so as to interact with said second chain of the structural element.

3. The unit as claimed in claims 1 or 2, wherein said chassis includes an assembly/disassembly module (21) including a device for assembling/disassembling said structural element, situated adjacent to said rolling members (17a, 17b, 17c; 34a, 34b, 35a, 35b).

4. The unit as claimed in claims 1 or 2 further including a member for supporting an object (P), said member being secured to one end of the structural element (E1, E2) for longitudinal translation of said member.

5. The unit as claimed in claim 4, further including a double wall (FP), said member (38) being a removable part of said double wall (FP), wherein said chains are retractably mounted in said double wall (FP), and wherein said unit also includes at least two box-type structures (39) mounted in the double wall and communicating with said chains and rolling members, said box-type structures (39) housing said chains when they are retracted.

6. The unit as claimed in claim 5, wherein said double wall is a false ceiling (FP) and wherein the retraction of said object is vertically upward.

7. A convertible structural element comprising two link chains capable of assuming a disassembled configuration wherein said chains are independent and flexible, and an interlocked configuration wherein said chains are interconnected to form a rigid beam, each of said chains including at least one row of a plurality of partially overlapping links, and pins having axes extending orthogonally to said links and pivotably connecting successive links to one another, said row extending lengthwise along said element when said element is in said interlocked configuration, each of said links of said row having first and second opposing bearing points, the first bearing point of the n-th link of said row interacting with the second bearing point of the n-1-th link of said row for trapping one of said pins of the other chain when said chains are in said interlocked configuration, the links of said at least one row of at least one of said chains each including a series of teeth having bearing surfaces extending in planes that are substantially parallel to said axes of said pins, such that, in said interlocked configuration, teeth at each of the extremes of said series of teeth on each of said links are in overlapping side-by-side relationship with the teeth at an extreme of the series of teeth of an adjacent link of said row, wherein said teeth project in a lengthwise continuous manner for forming a gear rack along the length of said chain.

8. The structural element as claimed in claim 7, wherein at least one of said chains includes a plurality of rows of links in parallel, and wherein at least two of these rows of links exhibit said teeth (13) forming a continuous teething in the direction of the length of said chain.

9. A structural unit comprising a plurality of structural elements as claimed in claim 7, a plurality of uprights (M1, M2) designed to be fixed to the ground, and a plurality of clamping collars (41a, 41b, 41c) having toothed impressions fitting the teeth (13) of said structural elements for clamping some of said structural elements to said uprights (M1, M2) for clamping the others of said structural elements between said uprights for securing said uprights together in spaced relationship to one another.

* * * * *